United States Patent [19]

West et al.

[11] 4,143,729

[45] * Mar. 13, 1979

[54] SNOW VEHICLE SUSPENSION SYSTEM

[75] Inventors: Burke A. West; Michael R. Bethell, both of Monroe, Mich.

[73] Assignee: Monroe Auto Equipment Company, Monroe, Mich.

[*] Notice: The portion of the term of this patent subsequent to Aug. 31, 1992, has been disclaimed.

[21] Appl. No.: 718,027

[22] Filed: Aug. 26, 1976

Related U.S. Application Data

[63] Continuation of Ser. No. 517,866, Oct. 25, 1974, Pat. No. 3,977,485.

[51] Int. Cl.$^2$ ............................................. B62M 27/00
[52] U.S. Cl. ................................... 180/5 R; 280/21 R
[58] Field of Search ........................... 180/3, 4, 5 R, 6; 280/21 R, 21 A, 25, 22

[56] References Cited

U.S. PATENT DOCUMENTS

| | | | |
|---|---|---|---|
| 3,504,752 | 4/1970 | Milward | 180/5 R |
| 3,596,726 | 8/1971 | Takada | 180/5 R |
| 3,674,104 | 7/1972 | Gostomski | 180/5 R |
| 3,765,498 | 10/1973 | Rogerson | 180/5 R |
| 3,977,485 | 8/1976 | West | 180/5 R |

Primary Examiner—Joseph F. Peters, Jr.
Assistant Examiner—John A. Carroll
Attorney, Agent, or Firm—Harness, Dickey & Pierce

[57] ABSTRACT

A snow vehicle suspension system including a pair of suspension struts associated one with each of the two steerable skis of the vehicle; each of the struts including a first generally tubular shaped housing fixably secured to the underside of the vehicle above the associated of the skis, a second generally tubular housing telescopically disposed within the first housing and connected at the lower end thereof to the associated ski, shock absorbing means within the second housing and including a reciprocable piston mounted on one end of a piston rod extending axially outwardly from the upper end of the first housing, the upper end of the piston rod being secured to a portion of the vehicle above the strut and having a helical coil spring extending coaxially thereof between the upper end of the strut and the aforesaid vehicle portion, a steering arm having a first portion operatively connected to the vehicle steering mechanism and a second portion rotatable about the longitudinal axis of the strut, with a second portion of the steering arm being slidably and non-rotatably connected to the second housing whereby the second housing is movable longitudinally thereof relative to the arm and is rotatable in response to actuation of the steering mechanism concomitantly with the arm.

30 Claims, 9 Drawing Figures

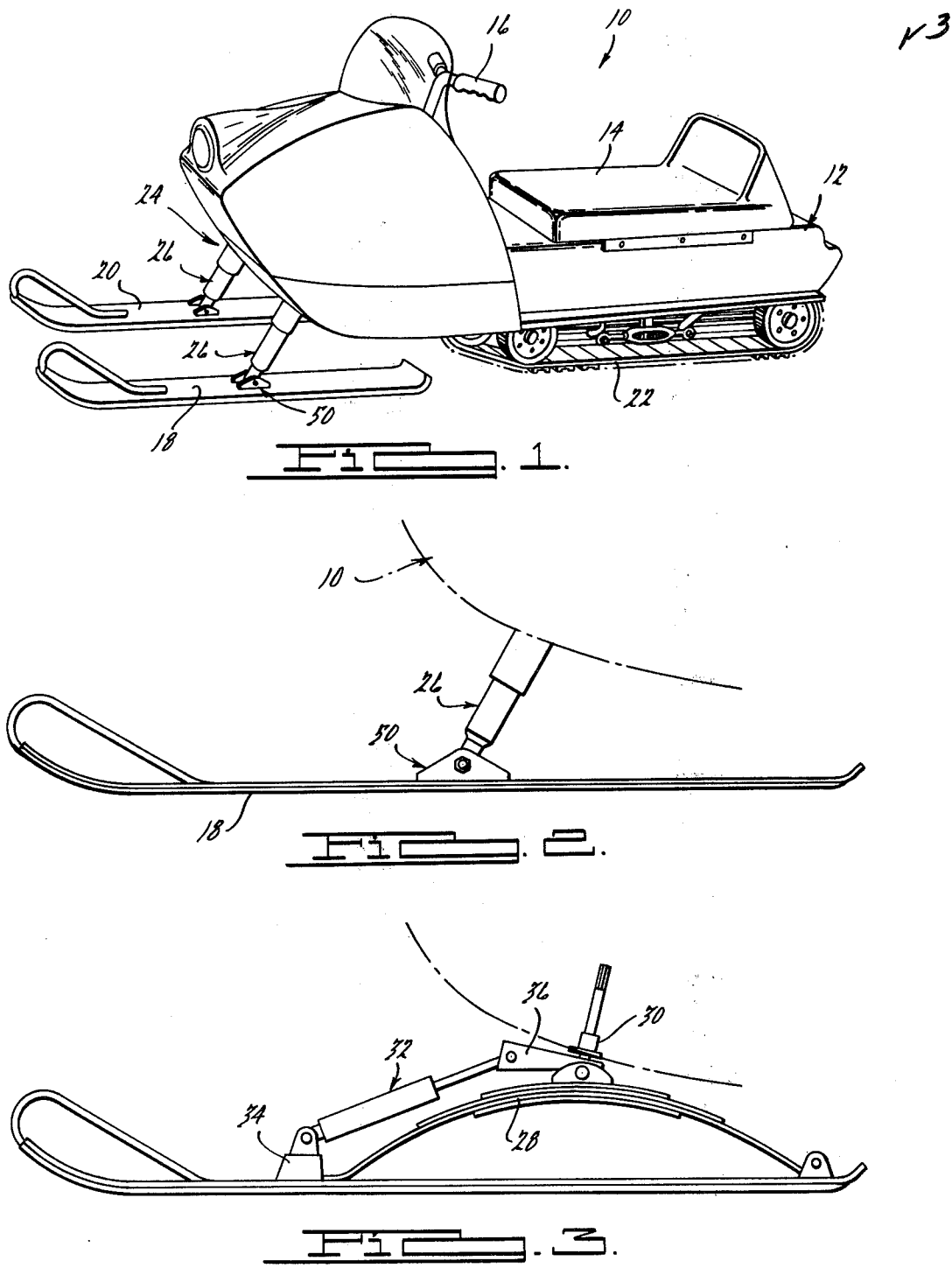

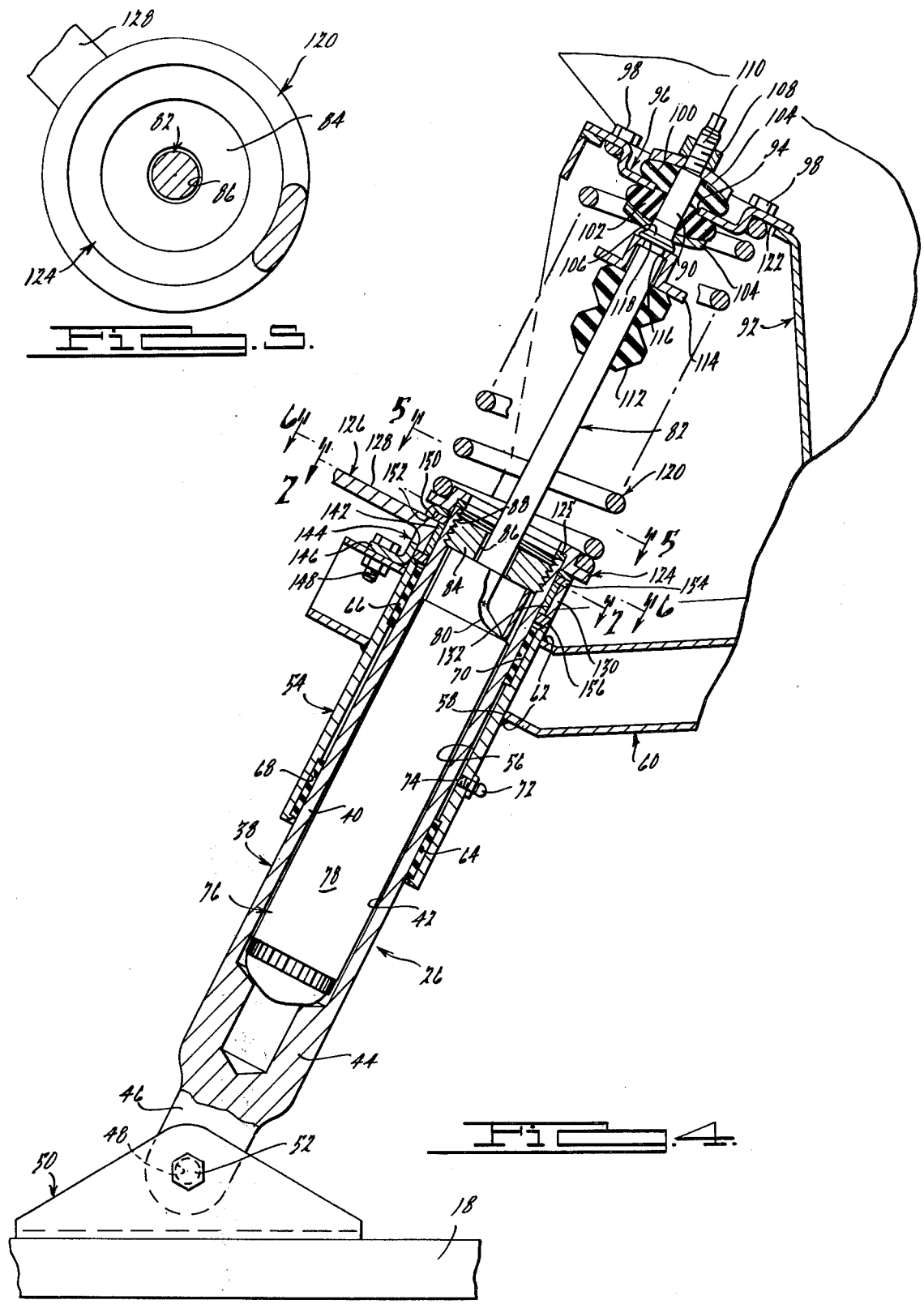

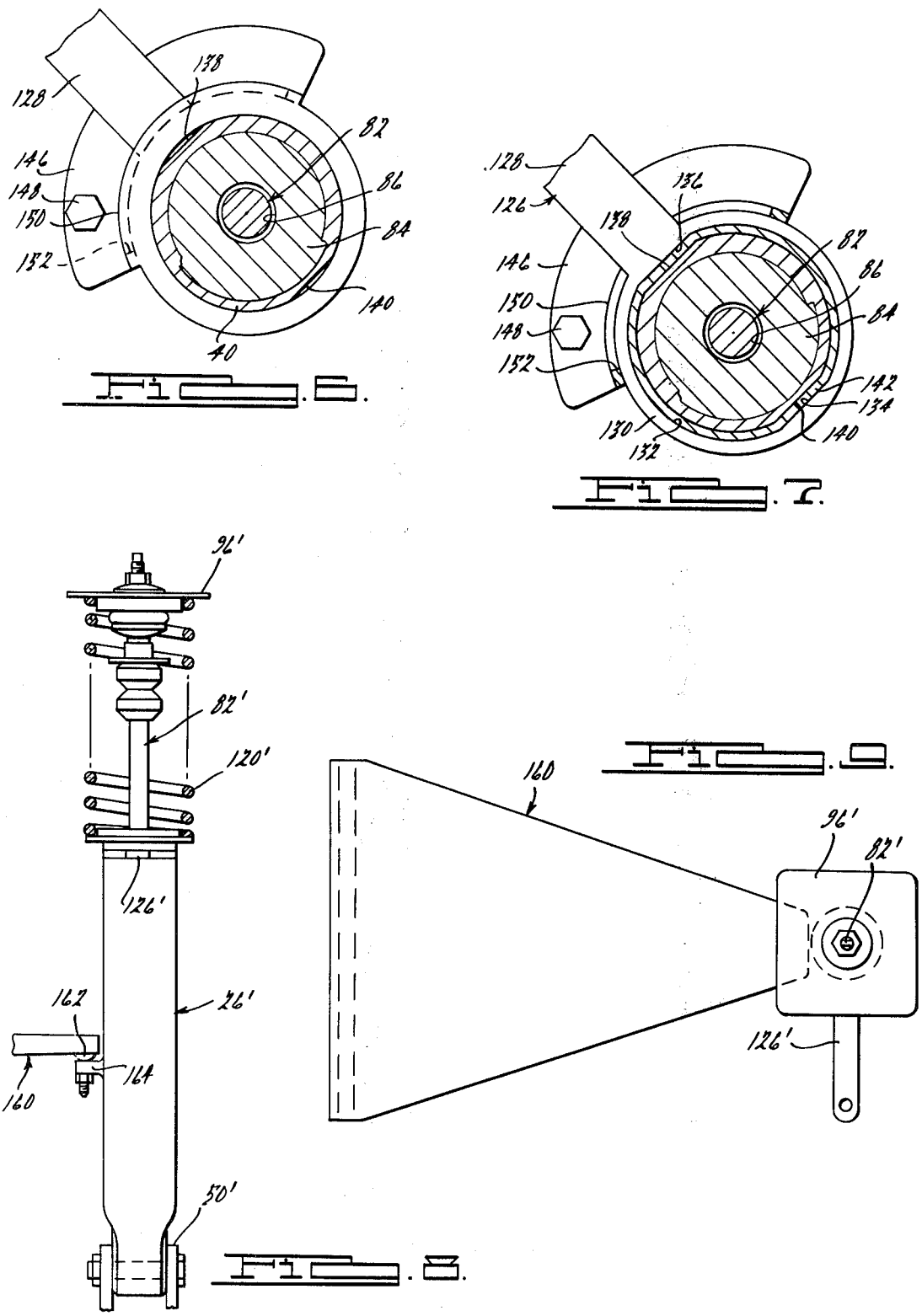

SNOW VEHICLE SUSPENSION SYSTEM

This is a continuation of application Ser. No. 517,866, filed Oct. 25, 1974 now U.S. Pat. No. 3,977,485.

BACKGROUND OF THE INVENTION

Early implementation of shock absorbers on recreational type snow vehicles, commonly referred to as snowmobiles, involved the mounting of the shock absorbers alongside the conventional leaf springs on the upper sides of the vehicle skis; however, such use of the shock absorbers was found to be objectionable due to the fact that the geometry did not permit use of the entire stroke of the shock absorber during operation thereof. As an alternative, it has heretofore been proposed to eliminate the use of the leaf spring and utilize a trailing arm on each ski of the vehicle which was pivoted about the front end of the ski and provided with a shock absorber between the rear end of the trailing arm and the rear of the ski. Such a snowmobile suspension provided a superior ride by utilizing a lower rate conical spring beneath the trailing arm to work in conjunction with the shock absorber. This arrangement, however, was subject to some criticism due to the fact that the arrangement was quite expensive to fabricate and gave the front end of the vehicle a "cluttered" look. Accordingly, most snowmobile manufacturers that utilize shock absorbers place them over or beside the leaf spring in the manner originally proposed. This arrangement involves the orientation of the shock absorbers at approximately 15° from the horizontal. As previously mentioned, however, this arrangement permits only approximately 1-¾ inch of useful travel of the shock absorber piston, as compared to almost 3-½ inches of travel that the associated leaf springs undergo.

The present invention provides a new and improved snowmobile suspension strut which obviates the objectionable features of each of the aforementioned types of snowmobile suspensions heretofore used. More particularly, the snowmobile suspension of the present invention utilizes a pair of suspension struts that are associated one with each side of the vehicle skis and which entirely eliminate the need for conventional leaf springs, as well as the need for trailing arms as incorporated in a snowmobile suspension of the type shown in U.S. Ser. No. 71,088, filed Sept. 10, 1970, owned by the common assignee of the subject invention. Generally speaking, the suspension struts for the present invention are used to replace the original ski spindles on the snowmobile vehicle, and the struts include a pair of generally tubular shaped cylindrical housings that are fixedly secured to the underside of the snowmobile and within which the shock absorber housings are telescopically received. The lower ends of the shock absorber housings are secured to the associated skis and the piston rods of the shock absorbers located within the shock absorber housings are fixedly secured to the frame or other suitable portion of the vehicle. The suspension springs are in the form of helical coil springs and are arranged coaxially of the piston rods between the upper ends of the struts and the aforesaid portions of the vehicle to which the piston rods are affixed. The original steering mechanism of the vehicle is secured via a pair of steering arms which are non-rotatably secured to the shock absorber housings and permit longitudinal sliding movement of the shock absorber housings, whereby to provide steering capability of the skis in response to operation of the steering mechanism of the snowmobile.

As will hereinafter be described in detail, the strut design eliminates the conventional leaf spring and spindle construction and the struts are oriented in a plane at approximately 30° from vertical, whereby when the vehicle skis ride over a bump or other severe terrain variation, the struts will not only move upwardly, but rearwardly. One particular feature of the present invention resides in the fact that the elimination of the leaf springs permits greater freedom of design, although the real "forte" of the present invention resides in the increased stability of the front end of the snow vehicle due to the fact that the skis are maintained in engagement with the terrain with a somewhat greater degree than with prior known snowmobile suspensions. This, of course, assures improved steering ability and reduced rider fatigue, as well as increased rider safety.

SUMMARY OF THE INVENTION

This invention relates generally to vehicle suspensions and more particularly to a new and improved vehicle suspension strut for snowmobiles and the like.

Accordingly, it is a general object of the present invention to provide a new and improved snowmobile suspension.

It is a more particular object of the present invention to provide a new and improved snowmobile suspension incorporating a pair of suspension struts which are utilized in place of the conventional ski spindles and associated leaf springs.

It is still another object of the present invention to provide a new and improved snowmobile suspension strut which is of a relatively simple design, is economical to manufacture and will have a long and effective operational life.

It is another object of the present invention to provide a new and improved snowmobile suspension strut which provides for increased rider safety and improved steering ability due to the fact that the associated snow-engaging skis are positively urged into engagement with the terrain over which the vehicle is traveling.

It is another object of the present invention to provide a new and improved snowmobile suspension strut having shock absorbing means in the form of a replaceable cartridge, whereby to provide for simplified replacement, maintenance and the like.

It is another object of the present invention to provide a new and improved snowmobile suspension strut which provides for greater design freedom through the elimination of the conventional leaf springs heretofore utilized in prior art type snowmobiles.

Other objects and advantages of the present invention will become apparent from the following detailed description taken in conjunction with the accompanying drawings.

BRIEF DESCRIPTION OF THE DRAWINGS

FIG. 1 is an elevated perspective view of a snowmobile vehicle having the suspension system of the present invention in operative association therewith;

FIG. 2 is a side elevational view of the snowmobile suspension system of the present invention.

FIG. 3 is a view similar to FIG. 2 and illustrates a prior art type snowmobile vehicle suspension;

FIG. 4 is a longitudinal cross-sectional view, partially broken away, of one of the vehicle suspension struts incorporated in the present invention;

FIG. 5 is a transverse cross-sectional view taken substantially along the line 5—5 of FIG. 4;

FIG. 6 is a transverse cross-sectional view taken substantially along the line 6—6 of FIG. 4;

FIG. 7 is a transverse cross-sectional view taken substantially along the line 7—7 of FIG. 4;

FIG. 8 is a side elevational view of a modified embodiment of one of the suspension struts incorporated in the present invention; and FIG. 9 is a top elevational view of the suspension strut shown in FIG. 8.

DESCRIPTION OF THE PREFERRED EMBODIMENT

Referring now in detail to FIG. 1 of the drawings, a snow vehicle or snowmobile, generally designated by the numeral 10, is shown generally as comprising a chassis 12 having an operator and passenger seating or riding area 14 and a manually operable steering mechanism 16. The vehicle 10 also includes a pair of terrain engaging steerable skis 18, 20 and motive power is provided by an engine operated endless drive track 22 located beneath the seating area 14, as is conventional in the art. In accordance with the principles of the present invention, the vehicle 10 is provided with a new and improved suspension system 24 that includes a pair of suspension struts, generally designated by the numeral 26, which function to operatively connect the skis 18, 20 with the chassis 12 and generally function to cushion the impact of the skis 18, 20 traveling over irregular terrain so as to assure rider stability, etc., as will hereinafter be described in detail. The suspension system 24 is intended to provide not only improved performance, but also an improved appearance as compared to prior art type suspension systems of the type shown in FIG. 3 which typically utilized an elongated leaf spring 28 connected at its opposite ends to the associated ski and to the vehicle by means of a steering spindle or the like 30. The suspension struts 26 of the present invention incorporate shock absorbing means interiorly thereof so as to virtually eliminate the exposure of said shock absorbing means to the elements and provide for improved geometry of operation as compared to prior art snowmobile shock absorbers such as is designated by the numeral 32 in FIG. 3. As shown in FIG. 3, the prior art type of snowmobile suspension has the shock absorber thereof arranged in almost a horizontal configuration and mounted by means of aesthetically objectionable and expensive mounting brackets 34, 36, all of which have been eliminated in accordance with the principles of the present invention, as best illustrated by comparing the side elevational view of the present invention in FIG. 2 with that of the prior art shown in FIG. 3.

By virtue of the fact that the suspension struts 26 are identical in construction and operation, a detailed description of only one of the struts 26 will be presented herein for purposes of conciseness of description. More particularly, and as best shown in FIG. 4, the suspension strut(s) 26 comprises a generally cylindrically shaped strut housing 38 which includes an enlarged thickness cylindrical side wall 40 defining an internal cylindrical chamber or cavity 42. The housing 38 includes an integral lower end section 44 which closes the lower end of the cavity 42 and includes a reduced size attachment section 46 formed with a bore 48 adapted to be secured to a clevis type mounting bracket 50 by means of a cross bolt or the like 52. The bracket 50 is secured by any suitable means, such as welding or the like, to the associated of the vehicle skis, such as the ski 18, and suitable cushioning means (not shown) fabricated of a natural or synthetic rubber, for example, may be provided interadjacent the outer periphery of the end section 48 of the housing 38 and the mounting bracket 50.

The strut housing 38 is adapted to be longitudinally slidably mounted within a generally cylindrically shaped housing 54 defining a cylindrical bore 56 and mounted within a suitable opening 58 formed in the forward portion of the snowmobile frame 60. The housing 54 may be secured within the opening 58 by any suitable means, such as by welding, as designated at 62. As seen in FIG. 4, the strut housing 38 is telescopically received within the bore 56 of the housing 54, with suitable anti-frictional sleeve bearings 54 or 56 being mounted within radially outwardly extending recesses 68, 70, respectively, interadjacent the inner periphery of the housing 54 and outer periphery of the housing 38 to provide for low friction sliding movement of the strut 26 within housing 54. If desired, a lubricant fitting 72 may be provided within a radial bore 74 in the housing 54 for introducing a suitable anti-friction lubricant into the cylindrical bore 56 within which the housing 38 is slidably mounted.

Disposed interiorly of the cavity 42 is a shock absorbing means in the form of a tubular direct acting hydraulic shock absorber, generally designated 76, which includes fluid cylinder 78 arranged coaxially within the housing 38 and having a valved piston 80 or the like reciprocably mounted therewithin. The piston 90 is mounted on the lower end of an elongated axially upwardly extending piston rod 82 that is secured to the snowmobile chassis or frame 60 in a manner hereinafter to be described. The shock absorber 76 is retained within the cavity 42 by means of an annular retaining or ring nut 84 having a central bore or opening 86 through which the piston rod 82 extends, the ring nut 84 being threadably received within an internally threaded upper end portion 88 of the housing 38. It will be noted that the shock absorber 76 may be of any one of a variety of different types or constructions and may be in the form of a removal cartridge that may be conveniently removed for purposes of repair, replacement or the like by simply disassembling the ring nut 84. Additionally, instead of the shock absorber 76 having its own cylinder 78, the housing 38, per se, may serve as the shock absorber cylinder with the piston 80 being reciprocably disposed directly within the cavity 42, and it is to be noted that the term "shock absorber means" as used herein is intended to encompass both types of construction.

The upper end of the piston rod 82 is formed with a reduced diameter end portion 90 that is adapted to be fixedly secured to an upwardly projecting support bracket 92 that is secured as by bolting, welding or the like to a suitable portion of the vehicle chassis 12, such as the frame 60 thereof. More particularly, the end portion 90 of the piston rod 82 extends upwardly through a central opening 94 of a mounting plate 96 that is secured by suitable screws, bolts or similar fastening means 98 to the upper side of the bracket 92. Means in the form of a pair of resilient, deformable doughnut-like cushioning elements 100, 102 are mounted on the end portion 90 on the opposite sides of mounting plate 96 and are retained between a pair of retaining discs 104 that are also mounted on the end portion 90. The entire assemblage of the elements 100, 102 and retaining discs 104 is secured between a radial shoulder 106 on the piston rod 82 and a suitable retaining nut 108 that is threadably received on an externally threaded terminal end portion 110 of the piston rod 82. A compression bumper 112 fabricated of a suitable resilient deformable material is mounted on the piston rod 82 below the end portion 90 thereof. The upper end of the compression bumper 112 bears against a retaining cup 114 having an inner peripheral portion 116 secured within a suitable annular recess 118 of the piston rod 82. As will be appreciated by those skilled in the art, the compression bumper 112 is adapted for engagement with the upper side of the ring nut 84 upon compression of the strut 26, i.e., when the piston rod 82 moves axially inwardly of the cylinder 78 during the compression stroke, whereby to prevent any damage to the various components of the strut 26.

A helical coil spring, generally designated 120, is disposed coaxially of the piston rod 82 and extends between the upper end of the housing 54 and the mounting plate 96. More particularly, the upper end of the suspension spring 120 bears against an annular shoulder 122 on the underside of the plate 96, while the lower end of the spring 120 bears upon and is supported by an annular spring retaining ring 124 located adjacent the upper end of the housing 54. Means in the form of a suitable anti-friction thrust bearing ring 125 is provided interadjacent the underside of the retaining ring 124 and the upper end of the housing 38, as illustrated. In a preferred construction of the present invention, the coil spring 120 is maintained under a predetermined state of compression, whereby to exert a resilient downwardly directed force against the strut 26, with the result that the associated ski 18 is resiliently urged into engagement with the terrain over which the vehicle 10 is travelling. This construction, of course, provides for greater stability and operator control since the skis are in contact with the terrain a greater period of time as compared to the various snowmobile suspensions heretofore known in the prior art.

The suspension strut 26 is provided with a steering arm, generally designated by the numeral 126, which generally functions to rotate the strut 26 relative to the housing 54 in response to operator actuation of the steering mechanism 16, i.e., handlebars, steering wheel, etc. Such rotational movement of the strut 26 in turn causes rotation of the associated ski 18 to provide for directional control of the vehicle 10. Typically, the steering arm 126 associated with each of the struts 26 includes an outwardly extending portion 128 connected to the steering tie rod (not shown) of the vehicle, with the tie rod in turn being connected to the operator controlled steering mechanism 16. The steering arm 126, along with having the outwardly extending section 128, comprises an annular section 130 which defines a central opening 132 within which the upper end of housing 138 is received. More particularly, and as best seen in FIGS. 6 and 7, the opening 132 is generally circular in shape, with the exception of being formed with a pair of "flats" or non-circular, generally diametrically opposed surfaces 134, 136. The opening 132 is complementary in shape with respect to the cross sectional shape of the outer periphery of the housing 38, and as such, the housing 38 is also formed with a pair of diametrically opposed, axially extending flat surface portions 138, 140 which are circumferentially aligned with the surfaces 134, 136, respectively, when the steering arm 126 is operatively assembled on the upper end of the housing 38. With this construction, the housing 38 is longitudinally slidable relative to the steering arm 126; however, rotational movement of the arm 126 under influence of the movement of the associated steering tie rod will cause concomitant rotational movement of the housing 38 and hence rotation of the entire strut 26 and ski 18 associated therewith. Means in the form of a suitable anti-friction bushing or bearing 142 is preferably provided around the inner periphery of the opening 132 in order to provide for low friction sliding movement of the housing 38 relative to the arm 126.

The steering arm 126 is operatively supported adjacent the upper end of the housing 54 by means of a steering arm retainer member 144 which is of a generally circular configuration, as seen in FIGS. 6 and 7 and includes an outwardly projecting mounting section 146 adapted to be secured by a suitable screw, bolt or the like 148, for example, to the frame or other portion of the vehicle 10. The main body of the retainer member 144, herein designated as 150, extends around the upper end of the housing 38 directly above the section 130 of the steering arm 126 and is formed with a circumferentially extending slot 152 in one side thereof through which the arm section 138 extends. As will be apparent, the circumferentially opposite ends of the slot 152 act as a stop means to limit rotational movement of the steering arm 126. Suitable thrust bushings or bearings 154, 156 are provided between the opposite sides of the steering arm 126 and the underside of the retainer member 144 and upper end of the housing 54 as best seen in FIG. 4.

FIGS. 8 and 9 illustrate a slightly modified embodiment of the suspension strut of the present invention wherein a strut 26' is shown consisting of a reciprocable piston rod 82', suspension spring 120' and mounting plate 96', which components are identical to the components of the aforesaid strut 26 having like numerals, with the exception that strut 26' is adapted to be operatively associated with a lower control arm or element 160 which functions in a controlling or stabilizing capacity and is secured to the strut 26' by means of a suitable ball joint or universal type connection 162 associated with an outwardly projecting lug or shoulder 164 on the outer periphery of the housing 38' of the strut 26'. The end of the control arm 160 opposite that which is connected to the strut 26' may be connected to any suitable structural portion of the associated snowmobile or snow vehicle, as will be appreciated by those skilled in the art.

It will be seen from the foregoing that the present invention provides a new and improved snow vehicle suspension system which overcomes a number of objections to suspension systems of prior known vehicles, which objections relate not only to the unsightly appearance of the leaf spring and shock absorber arrangement, but also to the unsatisfactory performance achieved with prior known shock absorber arrangements. In the present invention, the suspension springs and shock absorber means per se are essentially concealed within the snowmobile housing and as such are not subject to adverse climatic conditions. By virtue of the preloaded coil springs, increased stability at the front end of the snow vehicle will be achieved which, as previously mentioned, assures improved steering, reduced rider fatigue and increased rider safety.

while it will be apparent that the preferred embodiments of the invention disclosed are well calculated to fulfill the objects above stated, it will be appreciated that the invention is susceptible to modification, variation and change without departing from the proper scope or fair meaning of the subjoined claims.

We claim:

1. A suspension strut for a snow vehicle having at least one steerable ski, said strut comprising first and second telescopically slidable housings, one of said housings being fixedly secured to an associated portion of the vehicle, means on one of said housings for securing said strut directly to the steerable ski, shock absorbing means within one of said housings and including a damping piston cooperable with a quantity of damping fluid, and a piston rod extending axially from one end of said strut, said shock absorbing means being operable to dampen relative telescopic movement between said first and second housings, a helical coil spring means arranged coaxially of said strut, said spring means comprising the main suspension spring for said ski and yieldably resisting movement of said ski toward the vehicle, and a steering element for rotating said ski relative to the vehicle upon actuation of an associated vehicle steering mechanism, said steering element being connected to one of said housing members and being rotatable therewith about an axis extending generally coaxially of said strut when a steering force is applied to said element by said associated vehicle steering mechanism.

2. The invention as set forth in claim 1 wherein said first housing is of a generally cylindrical configuration.

3. The invention as set forth in claim 1 wherein said second housing is of a generally cylindrical shape.

4. The invention as set forth in claim 1 wherein said spring is non-rotatable relative to the vehicle.

5. The invention as set forth in claim 1 which includes bearing means interposed between said first and second housings to provide for longitudinal sliding movement of said second housing relative to said first housing.

6. The invention as set forth in claim 1 wherein said shock absorbing means comprises a direct acting hydraulic shock absorber disposed within said second housing.

7. The invention as set forth in claim 1 wherein said steering means is rotatably mounted adjacent the upper end of said first housing and is rotatable relative thereto.

8. The invention as set forth in claim 7 wherein said steering means comprises a steering arm having an opening at one portion thereof through which the upper end of said second housing means extends.

9. The invention as set forth in claim 8 wherein said opening in said steering arm and said upper end of said second housing are complementary in cross sectional shape.

10. The invention as set forth in claim 9 wherein said opening and said upper end of said second housing are of a generally circular shape in transverse cross section and have circumferentially aligned non-circular portions adapted to prevent relative rotation between said second housing and said arm.

11. The invention as set forth in claim 4 which includes spring retaining means adjacent at least one end of said spring.

12. The invention as set forth in claim 1 wherein said shock absorbing means comprises a direct acting hydraulic shock absorber cartridge removably mounted with said second housing, and which includes retaining means for releasably retaining said cartridge within said second housing.

13. The invention as set forth in claim 12 wherein said retaining means comprises a ring nut threadably received within an internally threaded portion at the upper end of said second housing.

14. The invention as set forth in claim 1 which includes auxiliary stabilizing arm means extending between the vehicle and a portion of said strut extending downwardly from the underside of said vehicle.

15. The invention as set forth in claim 5 wherein said bearing means comprises first and second axially spaced anti-friction bearings disposed between the inner periphery of said first housing and the outer periphery of said second housing.

16. In combination with a snow vehicle having a pair of steerable snow engaging skis and an operator controlled steering mechanism for steering the skis, a pair of helical coil springs arranged coaxially of said struts and comprising the main suspension springs for said skis, each of said struts including a first generally tubular shaped housing fixedly secured to the underside of the vehicle above the associated of the skis, a second generally tubular housing telescopically movable relative to said first housing and connected at the lower end thereof directly to associated ski, shock absorbing means within said strut and including a reciprocable piston mounted on one end of a piston rod extending axially outwardly from said strut, said piston rod being secured to a portion of the vehicle above said strut and having at least a portion of a helical coil spring extending coaxially thereof between the upper end of said strut and said vehicle portion, a steering arm having a first portion operatively connected to the vehicle steering mechanism and a second portion rotatable about the longitudinal axis of said strut, said second portion of said steering arm having said piston rod longitudinally slidable relative thereto and adapted to impart rotational movement to at least one of said housings upon actuation of the steering mechanism.

17. The invention as set forth in claim 16 wherein said first housing is of a circular cylindrical configuration and defines a cylindrical bore within which said second housing is telescopically received.

18. The invention as set forth in claim 17 wherein said second housing is of a generally circular cylindrical configuration.

19. The invention as set forth in claim 16 wherein said spring is non-rotatably supported.

20. The invention as set forth in claim 16 which includes anti-friction bearing means between said first and second housings.

21. The invention as set forth in claim 16 wherein said shock absorbing means comprises a direct acting hydraulic shock absorber.

22. The invention as set forth in claim 16 wherein said steering arm is rotatably mounted adjacent the upper end of said first housing.

23. The invention as set forth in claim 22 wherein said steering arm comprises a portion defining an opening within which the upper end of said second housing is disposed.

24. The invention as set forth in claim 23 wherein said opening and said upper end of said second housing are of a complementary shape.

25. The invention as set forth in claim 24 wherein said opening and said upper end of said second housing are of a generally circular configuration in cross section and have non-circular circumferentially aligned portions whereby said arm is non-rotatable relative to said second housing when said upper end of said second housing is received within said opening.

26. The invention as set forth in claim 19 which includes spring retaining means engaging at least one end of said spring for operatively supporting the same adjacent said strut.

27. The invention as set forth in claim 16 wherein said shock absorber comprises a direct acting hydraulic shock absorber cartridge removably received within said second housing.

28. The invention as set forth in claim 27 which includes retaining means for releasably retaining said cartridge within said second housing.

29. The invention as set forth in claim 16 which includes a pair of auxiliary stabilizing arms extending between said vehicle and the portions of said struts projecting downwardly from the underside thereof.

30. The invention as set forth in claim 20 wherein said bearing means comprises first and second axially spaced anti-friction bearings disposed between the outer periphery of said second housing and the inner periphery of said first housing.

* * * * *

Dedication 4,143,729.—*Burke A. West* and *Michael R. Bethell*, Monroe, Mich. SNOW VEHICLE SUSPENSION SYSTEM. Patent dated Mar. 13, 1979. Dedication filed Apr. 21, 1980, by the assignee, *Monroe Auto Equipment Company*.

Hereby dedicates to the Public the remaining term of said patent.

[*Official Gazette, June 17, 1980.*]